INVENTOR.
BARRETT DOYLE

United States Patent Office 3,167,706
Patented Jan. 26, 1965

3,167,706
NUCLEAR MAGNETIC RESONANCE ANALOG TO DIGITAL CONVERTER APPARATUS
Barrett Doyle, New Brighton, Minn., assignor to Honeywell Inc., a corporation of Delaware
Filed Aug. 31, 1961, Ser. No. 135,219
5 Claims. (Cl. 324—.5)

This invention relates to control apparatus and more particularly to analog to digital converters utilizing NMR (nuclear magnetic resonance) devices.

In prior art devices many schemes have been proposed for producing a digital output by applying a variable D.C. current to oscillators, motors, or electronic clocks. The variable current controls the frequency of the oscillator, the speed of the motor, or a gate circuit which allows an output from the electronic clock. In all of these devices the accuracy is poor because there are many variables besides the input current and the output frequency is generally not directly proportional to the input current over a wide range.

In the present apparatus a magnetic device is utilized to produce two magnetic fields. The changes of the strengths of these fields from a reference or bias value are proportional to the current applied to said magnetic device. This magnetic device may be comprised of a pair of C-shaped members composed of magnetic material and joined in their centers by a magnet. The two C-shaped members are joined by the magnet in a manner to provide two air gaps between their ends. The magnet which joins the two C-shaped members is so positioned as to create approximately equal flux density in each of the air gaps. A winding is then placed about a portion of one of the C-shaped members so that if a current is applied to the winding the flux density in one of the air gaps is different from that in the other air gap.

A wide variety of advantages is obtained by using the two-gap configuration explained in the previous paragraph for the magnetic device. Any changes in the flux density in the two air gaps caused by applying a current to the winding will not cause a change in flux density in the magnet joining the two C-shaped members. If the construction was such that a change in current applied to the winding necessitated a change in flux density in the magnet hysteresis would result causing great errors in the output. Any instability in the magnet due to temperature changes, weakening of the magnet, etc. will cause an equal change in each air gap. Also any dimensional changes in the magnet due to temperature will affect both air gaps equally. Thus, a magnetic device is utilized which is temperature stabilized and which eliminates many variables which would otherwise adversely affect the output of the present invention.

The windings of a pair of NMR devices are placed within the magnetic fields in the air gaps. The NMR devices utilized in this invention may be a pair of NMR spin generators of the type disclosed in the co-pending application of Abrahamsen and Senstad, Serial No. 118,704, filed June 21, 1961, entitled "Control Apparatus" and assigned to the same assignee as the present application. In this device a variable magnetic field produces a variable frequency output. The variable frequency output is directly proportional to the variations in the magnetic field applied.

The outputs of the pair of NMR devices are then applied to a heterodyning device. The two frequencies are beat together in the heterodyning device and a difference or a sum frequency appears at the output. In the present application it is preferable to use the difference frequency since it is a lower frequency and at null, that is when the two NMR devices are operating at the same frequency, the heterodyning device has an output of zero.

Thus, when no current is applied to the winding of the magnetic device the flux density in both air gaps is equal and the NMR devices are operating at the same frequency. These two frequencies are applied to the heterodyning device and the difference, which in the null case is zero, is the output or the digital representation. As a current is applied to the winding of the magnetic device the flux density in one of the air gaps increases while the flux density in the other air gap decreases, thereby causing a difference in total flux density in the air gaps. Since the flux densities in the two air gaps are not equal the NMR devices are operating at different frequencies. The different frequencies are beat together in the heterodyning device and the difference appears at the output. This difference frequency is a digital representation of the analog current applied to the winding of the magnetic device.

The digital representation at the output of the analog current will be very accurate since the output frequencies of the NMR devices vary directly with the magnetic flux density applied thereto and since the input current is the only variable in the circuit. Thus, it can be seen that a very accurate analog to digital converter is provided which is also inexpensive to construct and operate.

It is therefore an object of this invention to provide an improved control apparatus.

Another object of the present invention is to provide an improved analog to digital converter.

Other objects of the invention will be set forth more fully in and become apparent from a reading of the following specification and claims in conjunction with the accompanying drawings in which:

Figure 1:
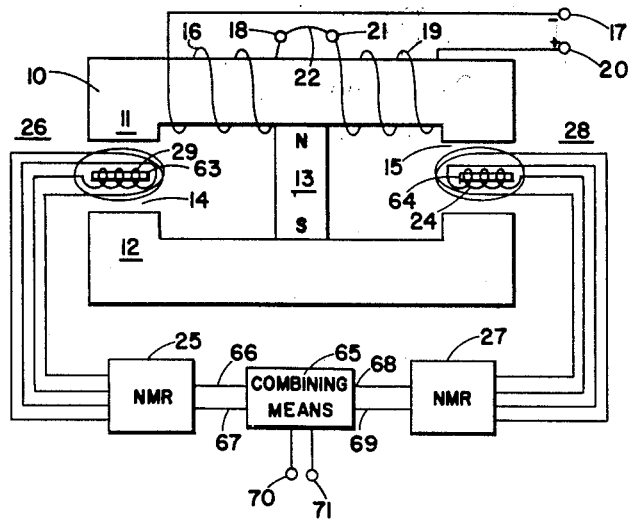
FIGURE 1 is a somewhat schematic presentation of the preferred embodiment of the present apparatus.

FIGURE 1 shows a magnetic device for producing two variable magnetic fields which is designated by numeral 10. Magnetic device 10 is comprised of two C-shaped magnetic members 11 and 12. C-shaped members 11 and 12 are composed of some relatively permeable magnetic material to reduce hysteresis and may be laminated to reduce eddy currents. A magnet 13 connects to each of the C-shaped members at approximately the center of the members. Magnet 13 is shown as a permanent magnet for simplicity but it could be an electromagnet or any other means for producing a magnetic flux. Magnet 13 may be connected or bonded to C-shaped members 11 and 12 by any convenient methods such as gluing. Magnet 13 joins C-shaped members 11 and 12 so as to provide two approximately equal air gaps 14 and 15 between the ends of the C-shaped members. It can be seen that since the magnet 13 is approximately in the center of C-shaped member 11 and C-shaped member 12 substantially equal flux will flow across air gap 14 and air gap 15. Also, any deviations in the length or the magnetic strength of the magnet 13 due to temperature changes, age, etc. will affect each of the air gaps 14 and 15 equally.

A winding 16 is wound about a portion of C-shaped member 11 between magnet 13 and air gap 14. Winding 16 has a terminal 17 and a terminal 18. A second winding 19 is wound about a portion of C-shaped member 11 between magnet 13 and air gap 15. Winding 19 has a terminal 20 and a terminal 21. In this preferred embodiment terminal 18 of winding 16 and terminal 21 of winding 19 are connected together by a lead 22. Thus, winding 16 and winding 19 are connected in series and a single current may be applied to the two windings between terminals 17 and 20.

In FIGURE 1 the north pole of magnet 13 is joined to C-shaped member 11 and the south pole of magnet 13 is joined to C-shaped member 12, but it should be noted that the invention would work as well if the north pole of magnet 13 were joined to C-shaped member 12 and the south pole were joined to C-shaped member 11. Winding 16 is wound around C-shaped member 11 so that when a current is applied between terminals 17 and 20, assuming terminal 20 positive and terminal 17 negative, the flux produced by winding 16 adds to the flux produced by magnet 13 to increase the flux across air gap 14. Winding 19 is wound around C-shaped member 11 so that when a current is applied between terminals 20 and 17 the flux produced by winding 19 subtracts from the flux produced by magnet 13 to decrease the flux across air gap 15. Thus, a current applied between terminals 20 and 17 has a push-pull effect in decreasing the flux in one air gap and increasing the flux in the other air gap.

Figure 2:
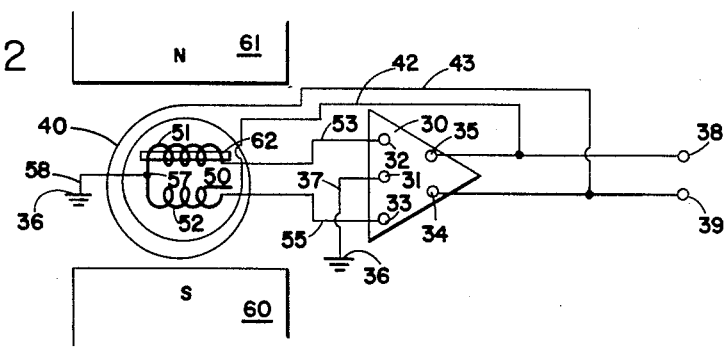
FIGURE 2 is a somewhat schematic presentation of an NMR spin generator.

Numeral 25 designates an NMR device which has its sensitive windings 26 mounted within air gap 14. Numeral 27 designates an NMR device which has its sensitive windings 28 mounted within air gap 15. NMR devices 25 and 27 may be of the spin generator, marginal oscillator, or any of a variety of nuclear magnetic resonances devices. For simplicity the windings 26 and 28 are shown representatively and it should be understood that if the NMR devices utilized are spin generators the windings 26 and 28 within air gaps 14 and 15 would actually appear as explained in subsequent paragraphs and portrayed in FIGURE 2. FIGURE 2 shows an NMR spin generator which will be explained briefly. It should be noted that the spin generator is simply utilized in the preferred embodiment because of its convenience of description. Any of the various NMR devices may be utilized by one skilled in the art and the spin generator is not intended to limit this invention in any way.

Numeral 30 designates a push-pull amplifier, the details and operation of which are well known to those skilled in the art. The amplifier 30 has a first input applied between two terminals 31 and 32 thereof. Terminal 31 is connected to ground 36 with a lead 37. Since terminal 31 is simply ground 36 or a reference point, this first input will hereafter be designated numeral 32. Amplifier 30 has a second input applied between terminal 31 and another terminal 33 which will hereafter be designated numeral 33 since terminal 31 is a reference terminal. Output means for amplifier 30 is depicted by a terminal 34 and a terminal 35. In this preferred embodiment amplifier 30 is a high gain amplifier and is so constructed that equal or nearly equal signals on the first input 32 and the second input 33 will cancel each other out and no output signal will appear on terminals 34 and 35. A push-pull amplifier is preferred because it can be constructed to cancel, or trim, out nearly equal voltages applied to the inputs, thereby facilitating the construction and alignment of the remainder of the circuitry.

A first winding means 40 is comprised of a single cylindrical coil with a comparatively large diameter. This coil is mounted, by means not shown, along an axis which is perpendicular to the plane of the paper. Winding means 40 is connected to output terminals 35 and 34 of amplifier 30 by means of a pair of leads 42 and 43. Thus, winding means 40 is energized by any output from amplifier 30 and is in effect an alternating magnetic field producing means. Output means for the complete device are depicted by a pair of terminals 38 and 39. Terminal 38 is connected to terminal 35 of amplifier 30 and terminal 39 is connected to terminal 34 of amplifier 30.

A second winding means or sensing means 50 is comprised of a first cylindrical coil 51 and a second cylindrical coil 52. Coil 51 and coil 52 are constructed as nearly identical as practical. One end of coil 51 is connected to the first input 32 of amplifier 30 by means of a lead 53. The other end of coil 51 is connected to a reference terminal 57. Terminal 57 is connected to ground 36 through a lead 58. One end of coil 52 is connected to the second input 33 of amplifier 30 by means of a lead 55. The other end of coil 52 is connected to reference terminal 57. Coils 51 and 52 are mounted, by means not shown, within the aperture of the winding means 40 so that any voltage induced into one of the coils 51 or 52 by the alternating magnetic field produced by winding means 40 is equally induced into the other coil.

By mounting winding means 50 along an axis substantially perpendicular to the axis along which winding means 40 is mounted very little of any mutual coupling is obtained between winding means 40 and winding means 50. When a voltage is induced in coil 51 by winding means 40 an equal voltage is induced in coil 52 by winding means 40 and both voltages are applied to the first and second inputs 32 and 33 of amplifier 30 where they are canceled out because the amplifier only amplifies their difference voltage. Thus, effectively no mutual coupling occurs between first winding means 40 and second winding means 50.

A means of producing a unilateral magnetic field consists of a north pole 61 and a south pole 60. These poles 60 and 61 are mounted, by means not shown, so that a unidirectional field is set up along an axis mutually perpendicular to the axis of winding means 50 and winding means 40. Poles 60 and 61 are further mounted so that winding means 50 is approximately centrally located therebetween. This is to insure as uniform a magnetic field as possible under the given conditions.

A sample 62 is placed within one of the coils 51 or 52 of winding means 50. Sample 62 is comprised of a diamagnetic material or some material with atoms having nuclei with non-zero magnetic moments. The nuclei of the atoms in sample 62 may be thought of as spinning bar magnets. When a magnetic field is applied to sample 50 by some means such as magnetic poles 60 and 61 the nuclei of the atoms in sample 62 tend to react as bar magnets and eventually align with the magnetic field. However, because of the spin of the nuclei a gyroscopic action occurs and the nuclei precess about their precession axes. When enough nuclei become aligned a voltage will be induced in coil 51. The magnitude of this induced voltage would depend upon the amount of precession and the number of nuclei aligned. This induced voltage will be an alternating voltage and the frequency will be dependent upon the magnitude of the magnetic field and the type of material used in sample 62. Since a voltage is induced in coil 51 by sample 62 but none is induced in coil 52, a net voltage is applied to input means 32 of amplifier 30 which is larger than the voltage applied to input means 33. The difference voltage is amplified and appears at output means 34 and 35. The amplified voltage is then applied to winding means 40 by means of leads 42 and 43.

The voltage from amplifier 30 alternating at the precession frequency energizes winding means 40. Since winding means 40 is energized at the precession frequency of the nuclei in the atoms of sample 62, it produces an alternating magnetic field, and this field is perpendicular to the unidirectional magnetic field produced by magnetic poles 60 and 61. This alternating magnetic field is alternating at the precession frequency of the nuclei in the atoms of sample 62 and adds to the precession of the nuclei vectorally causing them to precess farther. The alternating magnetic field may be thought of as giving regenerative or as giving the nuclei a push at just the proper moment to cause them to precess farther. As the nuclei precess farther a larger voltage is induced in coil 51 which is amplified by amplifier 30 and applied to winding means 40 causing the alternating magnetic field to become stronger. This increase of induced energy continues until the nuclei reach a maximum point or until the time at which the losses in the circuit just equal the energy applied. The maximum induced energy point is reached when the nuclei have precessed so far that instead of appearing as bar magnets nutating in a conical path they appear as bar magnets revolving in a flat disc. That is, the precession angle has become 90°.

It should be understood that this explanation of the operation of an NMR device has been greatly simplified and if more information concerning the NMR device shown in FIGURE 2 is desired reference may be made to the co-pending application previously identified.

Thus, the frequency at which this magnetic resonance generator operates its directly proportional to the magnitude of the magnetic field produced by magnetic poles 60 and 61 and the type of material used in sample 62. In FIGURE 1 coil 29 of NMR device 25 is mounted, by means not shown, within the air gap 14 between the ends of C-shaped member 11 and C-shaped member 12. Coil 24 of NMR device 27 is mounted, by means not shown, within the air gap 15. Coils 24 and 29 have a sample 64 and a sample 63 respectively therein. Sample 64 and sample 63 are composed of similar material so that the frequencies of NMR devices 25 and 27 are only dependent upon the amplitude of the magnetic fields within air gap 14 and air gap 15 respectively.

The output of NMR device 25 is connected to a signal combining means 65, which may be for example a suitable heterodyning means well known to those skilled in the art, by a pair of leads 66 and 67. The output of NMR device 27 is connected to signal combining means 65 by a pair of leads 68 and 69. The output of signal combining means 65 appears on a pair of leads 70 and 71. This output may be the difference between the frequency applied from NMR device 25 and NMR device 27 or it may be the sum of the frequencies from NMR device 25 and NMR device 27. However, for reasons which will be stated, in this preferred embodiment it is desired that the output on leads 70 and 71 be the difference between the frequencies applied from NMR devices 25 and 27.

When it is desired to represent an analog signal or a variable D.C. current digitally this may be accomplished by applying the current to terminals 17 and 20 of the present invention. Assuming, for explanational purposes, that terminal 20 is positive the current in coil 19 will cause the flux in air gap 15 to decrease while the current in coil 16 will cause the flux in air gap 14 to increase. As the flux in air gap 15 decreases the frequency of NMR device 27 decreases. Simultaneously, as the flux in air gap 14 increases, the frequency of the NMR device 25 increases. Since the frequency of the NMR device 27 being applied to the signal combining means 65 is decreasing while the frequency from the NMR device 25 being applied to the signal combining means 65 is increasing the difference frequency appearing at leads 70 and 71 is increasing. When the current applied to terminals 20 and 17 becomes zero the flux in air gap 14 and air gap 15 is equal and the frequency of NMR device 25 and NMR device 27 is equal. Since equal frequencies are applied to signal combining means 65 the difference on the output leads 70 and 71 is zero. Thus, for a zero input signal a zero output signal is obtained, and as the current applied at the inputs 20 and 17 is increased the frequency of the digital output at terminals 70 and 71 increases.

Figure 3:
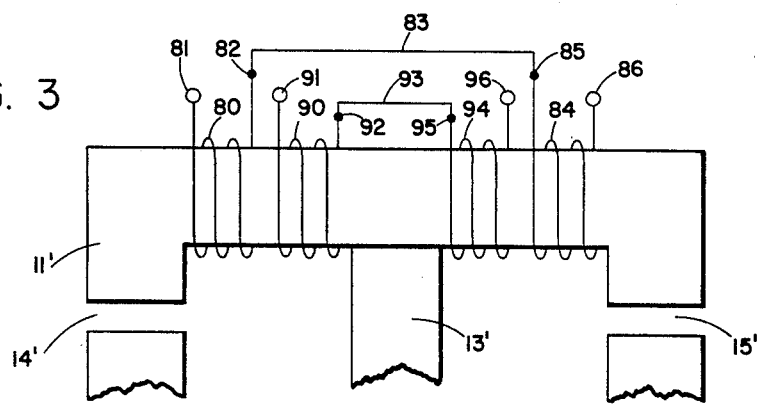
FIGURE 3 is a somewhat schematic presentation of an alternate winding of the magnetic device.

FIGURE 3 shows an embodiment of the present invention in which more than one current may be applied to vary the flux density in the air gaps. A magnetic circuit which is similar to the magnetic circuit in FIGURE 1 has been utilized except primes have been added to the numbers. A winding 80 is wound around the portion of C-shaped member 11' between air gap 14' and magnet 13'. Winding 80 is connected in series with a similar winding 84 by means of a lead 83. Winding 84 is wound around the portion of C-shaped member 11' which is between air gap 15' and magnet 13'. A winding 90 is wound around the portion of C-shaped member 11' between air gap 14' and magnet 13'. Winding 90 is connected in series with a similar winding 94 by means of a lead 93. Winding 94 is wound around the portion of C-shaped member 11' which is between air gap 15' and magnet 13'. Thus, a first current may be applied to windings 80 and 84 by means of a pair of terminals 81 and 86 and a second current may be applied to windings 90 and 94 by means of a pair of terminals 91 and 96. In FIGURE 3, the windings are drawn so that the output of the device will be proportional to the sum of the currents applied between terminals 81 and 86 and the current applied between terminals 91 and 96, however, by simply changing the direction of either of the sets of windings the output could be made proportional to the difference between the two currents.

Thus, an analog to digital converting device has been provided which is very accurate and may be made highly sensitive. Also, the device is easy and inexpensive to construct and operate.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. An analog to digital converter comprising: a magnetic device having two air gaps therein; magnetic flux producing means in intimate contact with said magnetic device so as to produce substantially constant and equal magnetic fields in each of said air gaps; winding means having a current applied thereto, said winding means being wound on said magnetic device and causing a substantial change of the magnetic field in one of the air gaps in said magnetic device, said magnetic device and said magnetic flux producing means being arranged so that said winding means has substantially no effect on the flux density in said flux producing means; a first and second nuclear magnetic resonance device; means mounting said first nuclear magnetic resonance device in one of the air gaps in said magnetic device and said second nuclear magnetic resonance device in the other air gap; heterodyning means; and means connecting said heterodyning means to said first and second nuclear magnetic resonance devices.

2. An analog to digital converter comprising: a first and second nuclear magnetic resonance device, said nuclear magnetic resonance devices having the characteristic of producing a variable output signal the frequency of which is dependent upon the variations in amplitude of a magnetic field applied thereto; magnetic flux producing means for producing two constant magnetic fields relative to each other; winding means adaptable to have a current applied thereto for varying said magnetic fields relative to each other about the constant value without varying the flux density in said magnetic flux producing means; means mounting said nuclear magnetic resonance devices contiguous with said magnetic fields; signal combining means; and means connecting said signal combining means to said first and second nuclear magnetic resonance devices.

3. An analog to digital converter comprising: a magnetic device having two air gaps therein; a unitary magnetic flux producing device having substantially constant flux density therein; means mounting said flux producing device in intimate contact with said magnetic device so as to produce magnetic fields in each of said air gaps which are constant relative to each other; winding means adaptable to have a current applied thereto, said winding means being wound on said magnetic device and causing a substantial change of the flux density in one of said air gaps when a current is applied thereto; a first and second nuclear magnetic resonance device; and means mounting said first nuclear magnetic resonance device in one of said air gaps and said second nuclear magnetic resonance device in the other of said air gaps.

4. An analog to digital converter comprising: a magnetic device having a plurality of magnetic legs fixedly connected by magnetic material; a first air gap in a first magnetic leg; a second air gap in a second magnetic leg; flux producing means in a third magnetic leg producing substantially constant magnetic fields in each of said air gaps relative to each other; winding means adaptable to have a current applied thereto, said winding means being wound on said magnetic device and when a current is applied thereto causing a substantial change of the magnetic field in one of said air gaps without altering the flux density in said flux producing means; a first and second nuclear magnetic resonance device; and means mounting said first nuclear magnetic device in said first air gap and said second nuclear magnetic device in said second air gap.

5. An analog to digital converter comprising: a magnetic device having two air gaps therein; a unitary magnetic flux producing device in intimate contact with said magnetic device so as to produce substantially constant and equal magnetic fields in each of said air gaps relative to each other; winding means having a current applied thereto, said winding means being wound on said magnetic device and causing a substantial change of the magnetic field in one of the air gaps in said magnetic device, said magnetic device and said flux producing device being arranged so that said winding means has substantially no effect on the flux density in said flux producing device; a first and second nuclear magnetic resonance device; means mounting said first nuclear magnetic resonance device in one of the air gaps in said magnetic device and said second nuclear magnetic resonance device in the other air gap; heterodyning means; and means connecting said heterodyning means to said first and second nuclear magnetic resonance devices.

References Cited in the file of this patent

UNITED STATES PATENTS

| | | |
|---|---|---|
| 2,589,494 | Hershberger | Mar. 18, 1952 |
| 3,014,210 | Deaumont | Dec. 19, 1961 |
| 3,103,623 | Greenwood | Sept. 10, 1963 |
| 3,109,138 | Varian | Oct. 29, 1963 |

FOREIGN PATENTS

| | | |
|---|---|---|
| 771,958 | Great Britain | Apr. 10, 1957 |